July 18, 1933.  H. R. SEGAL  1,918,989
RAZOR
Filed Dec. 31, 1930   3 Sheets-Sheet 1
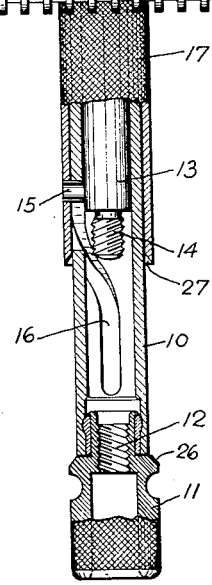
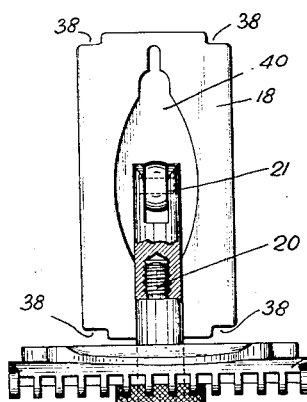
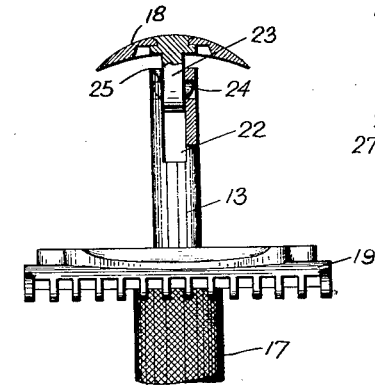
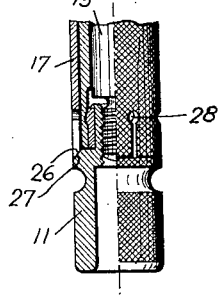
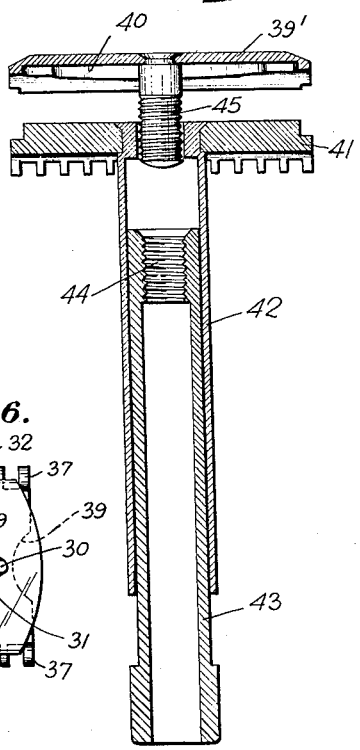
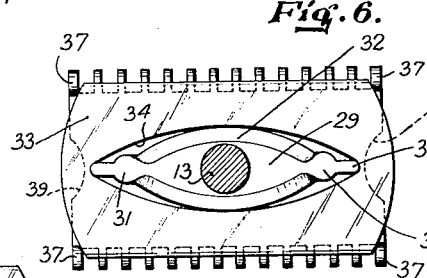
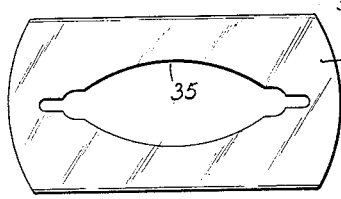
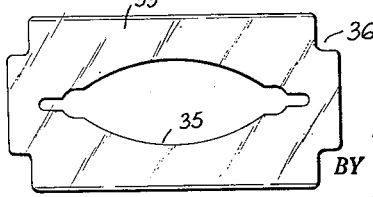
INVENTOR.
HYMAN R. SEGAL,
BY John H. Smoot.
ATTORNEY.

July 18, 1933.  H. R. SEGAL  1,918,989
RAZOR
Filed Dec. 31, 1930   3 Sheets-Sheet 2

INVENTOR.
HYMAN R. SEGAL,
BY John H. Smoot.
ATTORNEY.

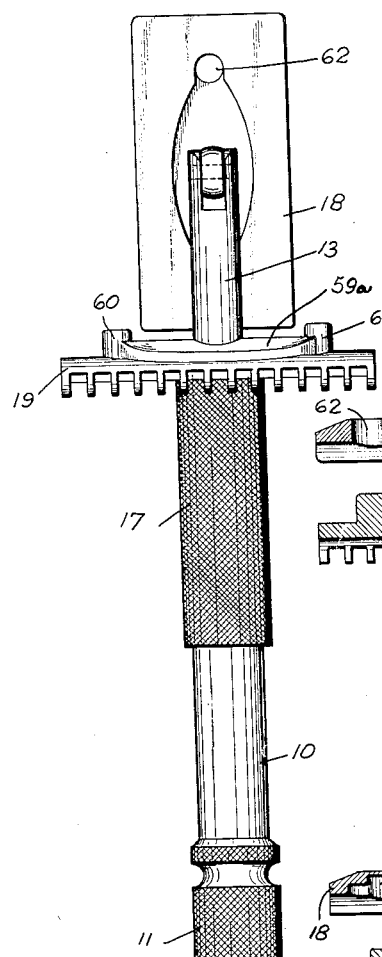
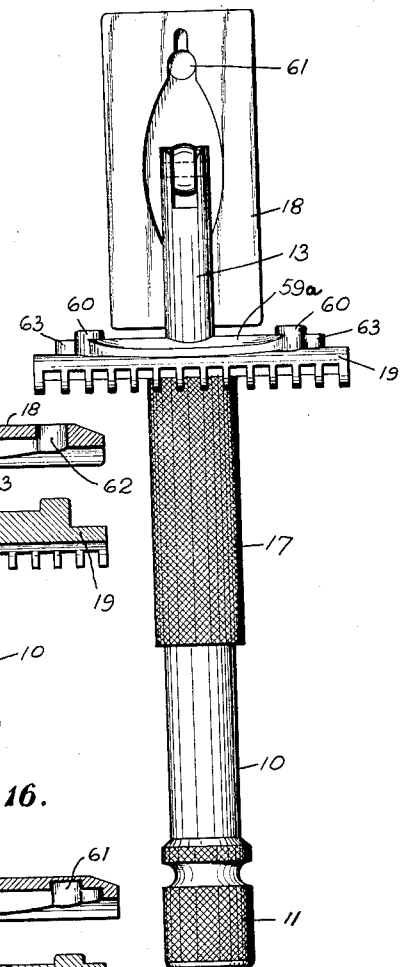
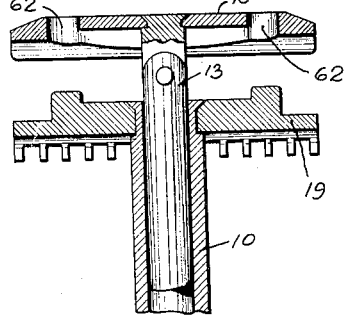
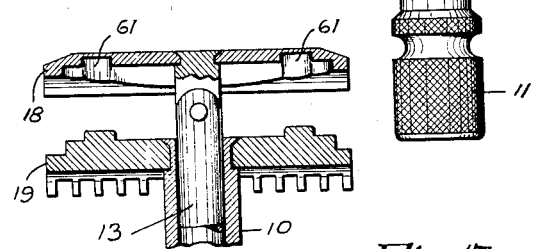
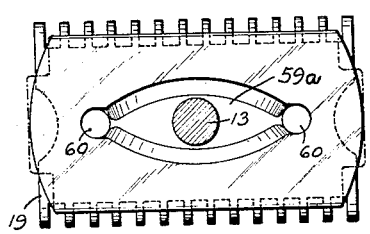
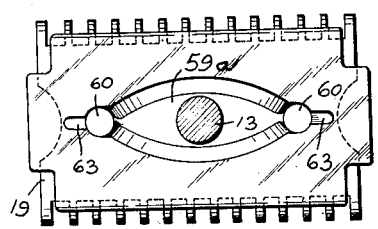

Patented July 18, 1933

1,918,989

UNITED STATES PATENT OFFICE

HYMAN R. SEGAL, OF NEW YORK, N. Y., ASSIGNOR TO SEGAL FOUNDERS CORPORATION, OF NEW YORK, N. Y., A CORPORATION OF NEW YORK

RAZOR

Application filed December 31, 1930. Serial No. 505,772.

This invention relates to a functionally and structurally improved razor.

It is an object of the invention to provide an article of this character which will be extremely rugged in construction and which will comprise relatively few parts, these parts being readily assembled to provide a razor unit operating over long periods of time with freedom from difficulties and which may be sold for a relatively nominal sum.

A further object of the invention is that of furnishing a razor in which the blade will be mounted and/or flexed in an improved manner and in which, moreover, the cutting edge will be presented on the surface to be shaved in such manner that the results desired will be most efficiently achieved.

An additional object is that of furnishing a razor for use in conjunction with various types of blades and in which the danger of crackage of blades or other incidents which might contribute to the user cutting himself will be reduced to a minimum.

A further object is that of providing a razor in which difficulties incident to the cutting edge of the blade accidentally contacting with the razor parts is almost completely avoided so that the life of the blade will be prolonged to a maximum extent.

With these and other objects in mind, reference is had to the attached sheet of drawings illustrating practical embodiments of the invention, and in which:

Fig. 1 is a partly sectional side view of a razor with the parts thereof in inoperative condition;

Fig. 2 shows these parts in operative condition;

Fig. 3 illustrates the same in intermediate condition;

Fig. 4 is a partly sectional view of a slightly different form of operating mechanism from that shown in Fig. 1;

Fig. 5 illustrates another form of clamping plate and guard;

Fig. 6 is a plan view of a guard such as has been shown in Figs. 1 and 5, and illustrating one form of blade in association therewith;

Figs. 7 and 8 show further forms of blade which may be employed in connection with razors of this type;

Fig. 12 is a view similar to Fig. 1 but showing a still different form of razor;

Fig. 13 is a sectional side view thereof;

Fig. 14 shows the parts in plan and with a blade in applied position; and

Figs. 15, 16 and 17 are views corresponding respectively to Figs. 12, 13 and 14, but showing a still different form of razor.

Figure 9:
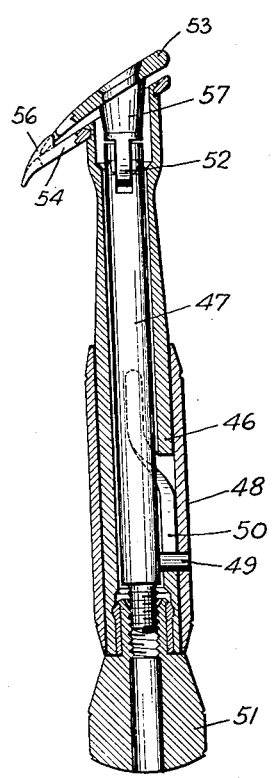
Fig. 9 is a sectional side view showing my invention embodied in a razor of the single edge type.

In these views, the numeral 10 indicates a tube to the lower end of which a preferably knurled knob 11 is rotatably secured, this knob having a screw threaded bore 12 in line with the bore of the tube 10. Slidably mounted within the latter is a stem or post 13 having a screw threaded extension 14 for cooperation with the threads of the bore 12. The stem 13 carries a pin 15 which rides within and preferably extends beyond the slot 16 which has an arcuate portion and is formed in the tube 10. The pin 15—which may be removable or shiftable (not shown)—has its outer end carried by a sleeve 17 which encircles and is slidably mounted upon the tube. Accordingly, as the sleeve is reciprocated along the tube, it is obvious that the post or stem 13 will be shifted and also turned with respect to this tube. This turning will in no wise effect detrimentally the operation of the device for the reason that with one hand grasping the knob 11 and the other hand grasping the sleeve 17, these parts may be truely reciprocated without the fingers engaging the parts which will turn as a result of such shifting. The foregoing structure has been described and illustrated in applications heretofore filed.

One of the features of the present invention is that of having the clamping plate removable. This clamping plate which has been identified by the numeral 18 is pivotally mounted at the upper end of the post or stem and preferably has one of its ends of slightly greater weight than its other end so that it will normally tend to rock as soon as the clamping plate is moved out of supporting engagement with respect to the guard 19. The same result may of course be achieved without necessarily having one arm or end of the clamping plate relatively weighty in that the latter due to shifting of the parts will assume an unbalanced condition and rock in the manner shown in Fig. 1. Also, the same results might be achieved by having the pivot slightly off center. With a view to having the clamping plate detachable, the structure shown in Figs. 1 or 3 may be employed. In the former figure, the upper section of the stem 13 is simply detachable and has to this end for example a screw threaded end 20. The pivot 21 for the clamping plate is of a more or less permanent nature and permits of a free swinging of the plate with respect to the same.

In the form of construction shown in Fig. 3, it will be seen that the end of the stem is forked and that the arms thereof are relatively long as has been indicated at 22. These arms incorporate sufficient resiliency so that it is possible to spring them in opposite directions for the purpose of removing the clamping plate. The latter as shown in both of the views referred to has a stud 23 extending downwardly from its inner face and which stud mounts or accommodates a pivot pin. The pin, as shown in Fig. 3 preferably has bevelled ends as at 24 which may cooperate with bevelled recess portions 25 formed at the outer ends of the arms 22 so that the stud together with the pin carried thereby may readily be forced into position and when in such position, the arms will snap into place around the pivot pin. In both of these forms of construction, it is obvious that by detaching the clamping plate, the parts may be separated by simply retracting or removing the pin 15. Another feature of the invention is that of preventing any annoying play coming into being between the sleeve 17 and the other parts when the latter are in their seated position. With a view to achieving this result and if contact between the inner edge of the knob 11 and the sleeve 17 is not sufficient to accomplish the same, the inner edge of this knob may for example be bevelled as at 26 to accommodate the correspondingly shaped edge 27 of the sleeve and if desired as shown in Fig. 4, the lower portion of the sleeve may be split as at 28 in order that this sleeve part may have a certain yielding action permitting of a proper seating of one part upon the other.

Another and in certain aspects more important feature of the invention is that of having the guard formed with a lug or abutment 29 which, as shown in Fig. 6 comprises a generally oval shaped body terminating in extended end portions 30 between the inner ends of which and the body of the abutment somewhat circular extensions 31 are provided. The edges of the abutment are bevelled as at 32 and by this construction, the clamping plate will readily cam against one of the edge portions 32 so that in moving towards the guard and turning with respect to the same a rocking movement will be initiated which will assure proper action on the part of the plate. Also the blades will be held firmly against accidental displacement regardless of whether these blades, the bodies of which have been designated at 33 simply have an oval shaped opening 34; have an opening 35 shaped to conform to the abutment, or have such an opening in conjunction with recessed corner portions 36.

Still another feature of the invention resides in the use, if desired, of corner protecting lugs 37 which may form a part of the guard 19 and are alined with the comb teeth thereof. These lugs as shown especially in Fig. 2 will be preferably somewhat raised and either the ends of the blades will be curved so that they will clear these lugs, or else the corner recesses 36 will be employed for this purpose. The clamping plate as especially shown in Fig. 1, will preferably have corner recesses 38 which when the plate is in position will provide spaces for the accommodation of the lugs 37. Also, in any instance and if desired, the guard may have recesses 39 for the accommodation of the thumb and finger so that a removal of the blade may be achieved readily.

In both Figs. 1 and 5, the clamping plates 18 and 39' have recesses 40 of a configuration approximating that of the abutment associated with the guard. The guard 41 as shown in Fig. 5 is mounted upon a tube or sleeve 42 which accommodates a stem 43 having a screw threaded bore 44 for accommodating a correspondingly threaded stem 45 carried by or forming a part of the clamping plate. By such a construction, a three part razor is furnished which will efficiently mount and properly flex among others the several types of blades as shown in Figs. 6 to 8. Of course, the abutment shown in Fig. 5 need not have bevelled edge portions such as 32. This construction may be used as an alternative if it is not desired to employ a rocking type of clamping plate which is substantially permanently attached to the stem.

Figure 10:
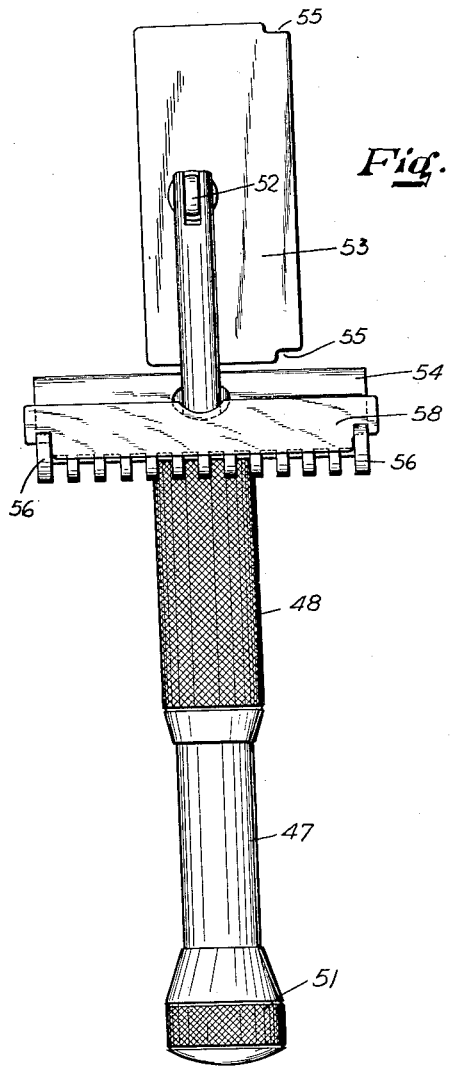
Fig. 10 is a front view of such razor.
Figure 11:
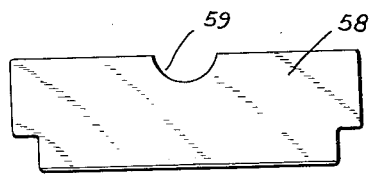
Fig. 11 is a plan view of the blade applied in conjunction therewith.

In the form of razor shown in Figs. 9 and 10, a tube 46 is provided which slidably accommodates a stem 47 and in turn mounts a sleeve 48 which is connected to the stem by means of a pin 49 projecting through a spirally extending slot 50 formed in the tube. A knob 51 is engageable with the end of the stem for the purpose of drawing the latter together with associated parts into proper position. Pivotally mounted as at 52 and employing any of the constructions heretofore described in this connection is a clamping plate 53 which cooperates with a guard 54. Obviously, as the sleeve is raised, the stem is moved correspondingly and additionally rotated in order to elevate the clamping plate and effect a rocking of the latter. This plate has cut out portions 55 especially if protecting lugs 56 form a part of the guard and the foregoing parts as will be seen correspond substantially to the constructions described in connection with Figs. 1 to 4.

However, it is preferred that the clamping plate and guard be not transversely curved so that the blade 58 need not necessarily be transversely flexed. However, if such flexing is desired, this may be achieved readily by simply having the stud 56 slightly tapered and having a notch 59 in the rear blade edge and having this notch of sufficient area to accommodate the stud. By this construction and as the clamping plate is drawn into cooperation with the guard, the stud or post 57 will cam against the rear edge of the blade and the latter due to the fact that it can not move forwardly will flex somewhat, thus accomplishing the results desired.

In certain instances, it may be desired to provide means auxiliary to for example the lugs 37 in order to retain the blade against accidental displacement particularly when the clamping plate is in elevated condition. Of course, it will be understood that in the preceding views, the center abutment also serves to prevent blade displacement and the following structure might be utilized as afore brought out, or auxiliary to the lugs or substitutional therefor. Referring to Figs. 12 and 15, the abutment 59a has what might be termed end posts 60 which are received in recesses 61 or openings 62 in the clamping plates. In both forms, these posts extend materially above the body of the abutment and thus blade displacement is prevented. In the form shown in Fig. 15, the abutment extends as at 63 beyond the posts and the latter are preferably of less height than the posts as shown in Fig. 12. This may be for the reason that the clamping plate in camming through its tilting positions will engage the extension 63 so that there will be no danger of contact occurring between the clamping plate and the cutting edge of the blade. On the other hand, in the form shown in Fig. 12, the posts 60 should preferably be of greater height so as to prevent contact occurring, and particularly to assure of an easily operating mechanism. In both forms, blades of the character shown in Fig. 8 may be employed, but if only the construction of Figs. 12 to 14 is produced, the blade need not necessarily have its center opening extending in the form of slots beyond points at which the posts would project.

From the foregoing, it will be understood that among others, the several objects of the invention as specifically afore brought out are achieved. It will, moreover, be understood that numerous changes in construction and rearrangements of the parts might be resorted to without departing from the spirit of the invention as defined by the claims.

Having described my invention, what I claim as new and desire to secure by Letters Patent, is:

1. A safety razor including in combination, a guard, a stem connected thereto, a clamping plate for association with said guard, a rod slidable within said stem and pivotally mounting said clamping plate, means for effecting the movement of said clamping plate away from said guard and the concurrent rotation of the former with respect to the latter, a blade positioning abutment on the upper face of said guard, and upwardly extending end posts on said abutment for engaging the leading edge of said clamping plate as the latter is rotated with respect to the former.

2. A safety razor of the single edged type including in combination, a stem, a guard carried by said stem and secured to the latter at an angle to the perpendicular, comb teeth disposed adjacent the shaving edge of said guard, blade positioning lugs carried by said guard at each end of said comb tooth edge, a rod slidable within said stem, a clamping plate pivotally carried by said rod and a single edged razor blade for cooperation with said guard and clamping plate, said blade being provided with a central disposed recess in the unsharpened edge thereof for cooperation with said rod and a plurality of positioning recesses at each end of the cutting edge thereof for cooperation with said positioning lugs on said guard.

3. A safety razor of the single edged type including in combination, a stem, a guard carried by said stem and secured to the latter at an angle to the perpendicular, comb teeth disposed adjacent the shaving edge of said guard, blade positioning lugs carried by said guard at each end of said comb tooth edge, a rod slidable within said stem, a clamping plate pivotally carried by said rod and a single edged razor blade for cooperation with said guard and clamping plate, said blade being provided with a central disposed recess in the unsharpened edge thereof for cooperation with said rod, and means associated with said stem and rod for moving said clamping plate away from said guard and concurrently effecting its rotation with respect thereto.

4. A safety razor of the single edged type including in combination, a stem, a guard carried by said stem and secured to the latter at an angle to the perpendicular, comb teeth disposed adjacent the shaving edge of said guard, blade positioning lugs carried by said guard at each end of said comb tooth edge, a rod slidable within said stem, a clamping plate pivotally carried by said rod and a single edged razor blade for cooperation with said guard and clamping plate, said blade being provided with a central disposed recess in the unsharpened edge thereof for cooperation with said rod, means associated with said stem and rod for moving said clamping plate away from said guard and concurrently effecting its rotation with respect thereto, and means for locking said parts in shaving relationship.

5. A single-edge razor including a tube, a stem movable therein, a clamping plate pivotally attached to said stem, a guard mounted on said tube and cooperating with said plate, means for effecting shifting of said stem with respect to said tube, and a blade interposed between said guard and clamping plate and being formed with a stem-accommodating notch in its rear edge.

HYMAN R. SEGAL.